United States Patent [19]
Garcia

[11] 3,952,990
[45] Apr. 27, 1976

[54] CONTAINER TYPE MOLDING DEVICE OF MATCHED SEGMENTS

[76] Inventor: Onofre S. Garcia, 77 Prospect St., Newark, N.J. 07105

[22] Filed: Aug. 27, 1974

[21] Appl. No.: 500,922

Related U.S. Application Data

[63] Substitute for Ser. No. 245,130, May 18, 1972, abandoned.

[52] U.S. Cl................................ 249/63; 249/149; 249/153; 249/179; 249/180
[51] Int. Cl.².......................................... B29C 11/00
[58] Field of Search ............... 425/468; 249/63, 64, 249/83, 124, 134, 142, 149, 153, 152, 178, 179, 183, 180, 181, 182

[56] References Cited
UNITED STATES PATENTS

| 719,679 | 2/1903 | Lyman | 249/180 X |
|---|---|---|---|
| 1,747,679 | 2/1930 | Perry | 249/180 X |
| 1,997,232 | 4/1935 | Richards | 249/153 X |
| 2,961,849 | 11/1960 | Hitchcock | 249/83 X |
| 3,865,529 | 2/1975 | Guzzo | 249/180 X |

Primary Examiner—R. Spencer Annear
Assistant Examiner—Mark Rosenbaum

[57] ABSTRACT

A molding device including a rigid container defining a molding chamber and a mating collapsible member with walls and a floor and of a normal size and shape to mate in the rigid container and define a molding space between the container and the collapsible member; the collapsible member includes means to collapse it through a first stage of movement of withdrawal of the walls inwardly from a molded object and a second stage of movement of withdrawal of the floor axially upwardly away from the container and a molded object.

2 Claims, 3 Drawing Figures

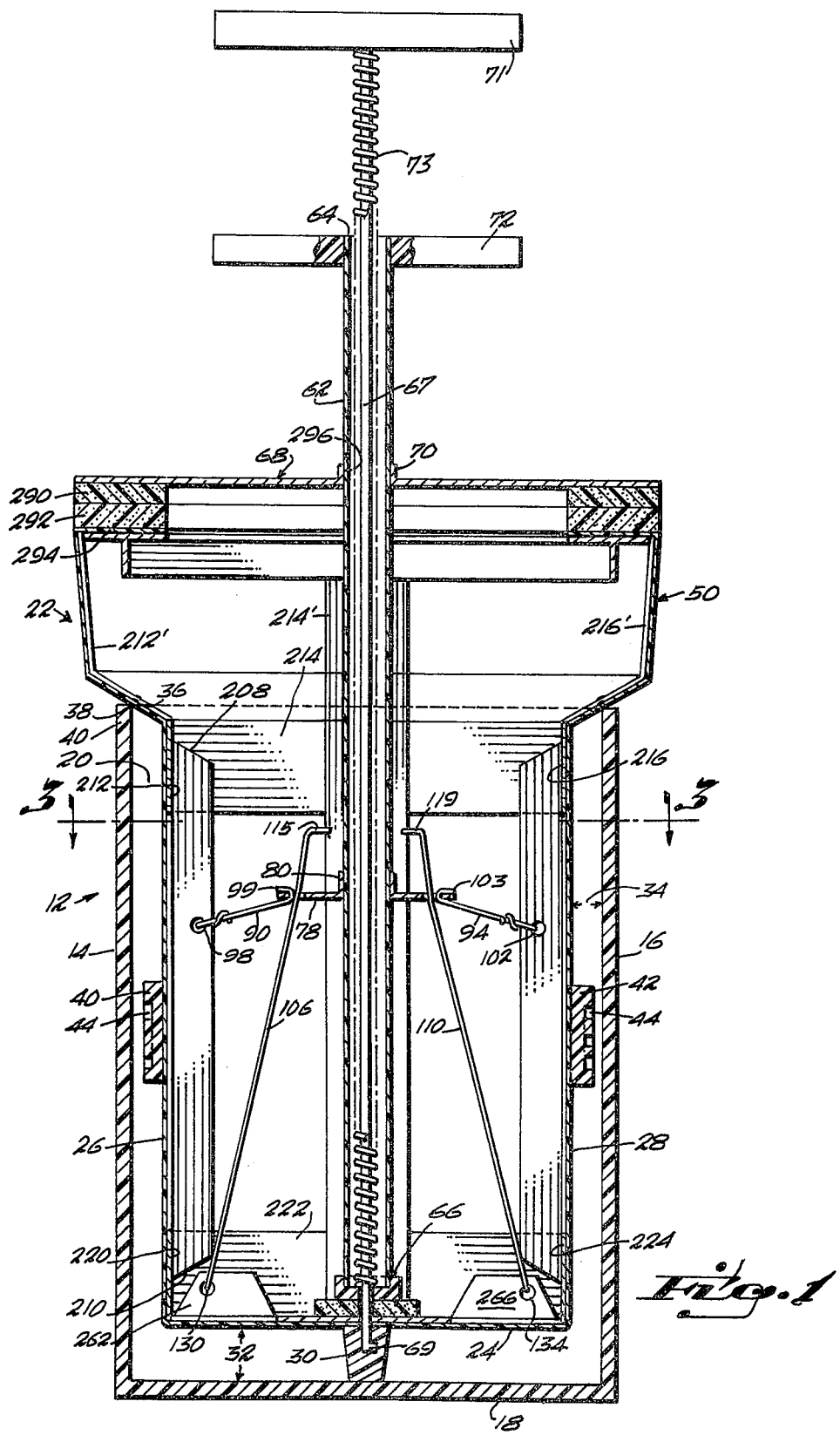

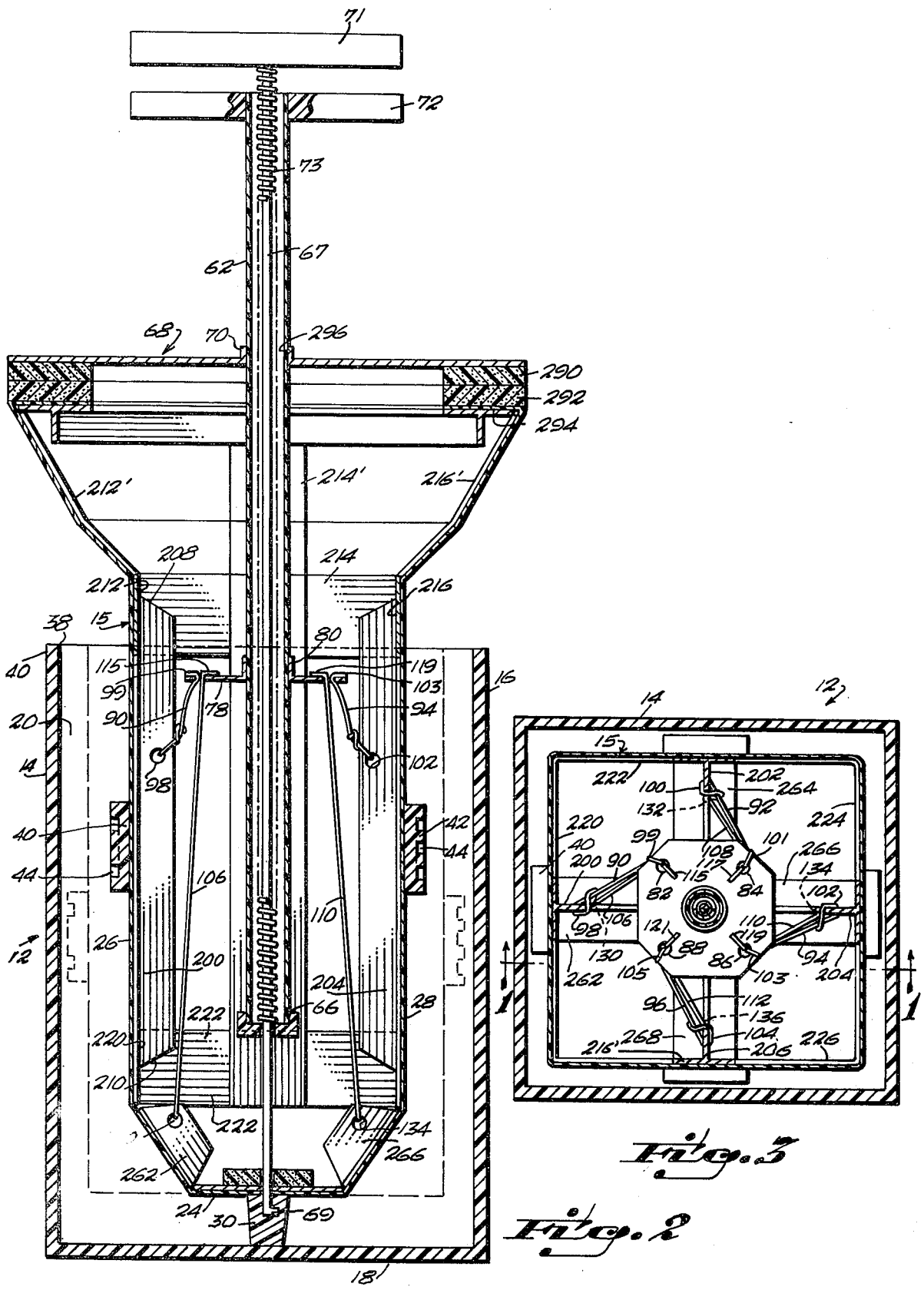

CONTAINER TYPE MOLDING DEVICE OF MATCHED SEGMENTS

FIELD OF THE INVENTION

This invention relates to molding device of matched male and female segments to define a molding space therebetween for receiving a charge of flowable material to be caused to solidify in the molding space of the device.

BACKGROUND OF THE INVENTION

In the past it is known to mold materials between two confronting surfaces and, thereafter, to separate the surfaces. This invention is of a rigid tubular female member and a mating male member to fit in the female member which is callapsible in a first stage of generally radially inwardly movement of the walls of the male member and, thereafter, a second stage of axial movement of the male member. The invention is particularly useful for molding ice into an open container shape within which an item to be kept cool may be temporarily stored and which may include an insulation jacket surrounding the molded ice container. While not limited to molding of ice containers, which is a preferred product of the apparatus, the invention, it will be appreciated, may be utilized for molding other flowable molding materials into a solid state of predetermined size and a generally container-shaped configuration.

It is, therefore, an object of this invention to provide an inexpensive molding device including a first rigid container defining a molding chamber and a second collapsible member to be received within the container in spaced confronting relation defining within the container a molding space and which surfaces are adapted to be separated from one another by removing the member from the rigid container in a first stage of radial movement of separation of axially projecting walls and a second stage of movement of axial movement of the floor away from the floor of the container.

In accordance with these and other objects which will become apparent hereinafter the invention will now be described with reference to the accompanying drawings in which:

DESCRIPTION OF THE DRAWINGS

FIG. 1 is a view in cross section of the container of the instant invention on the plane indicated by the line 1—1 of FIG. 3 and looking in the direction of the arrows 1—1;

FIG. 2 is a view similar FIG. 1 and illustrating the operation of the instant invention; and FIG. 3 is a view in cross section taken on the plane indicated by the line 3—3 of FIG. 1 and looking in the direction of the arrows.

DESCRIPTION OF THE PREFERRED EMBODIMENT

Referring to the drawings, the numeral 12 designates an open, generally cylindrical, container 12, which, as shown, is rectangular as seen in cross section in plan. The container illustrated includes front and rear and opposing side walls 14 and 16 in upstanding generally perpendicular relation with respect to a floor 18 which spans the walls at their lower ends. There is thus defined an open top molding chamber 20. The container is of rigid material so as to hold its shape in the use of the apparatus to be described hereinafter.

A collapsible mating member 22 is provided which is sized, when in a normal uncollapsed configuration, for receipt in the chamber 20 of the container 12. The member includes a floor 24 of foreshortened dimensions with respect to the floor 18 of the container, as seen in plan. In generally perpendicular relation to the floor, front, rear and side walls 26 and 28 are provided on the floor extending upwardly therefrom. Spacer means 30 are carried exteriorly on the floor 24 of the collapsible mating member 22 to space the floor 24 a predetermined distance, generally designated by the numeral 32, from the floor of the container 18 when in mating or molded relation therein. Centering means for maintaining the walls of the collapsible member at a predetermined distance 34 from the walls of the container 12 are preferably provided and may comprise, as in the embodiment shown, a slight annular groove 36 which mates with the corner 38 of the upper end 40 of the container. This molding space is defined surrounding the inner collapsible mating member in the container which is of predetermined thickness therearound.

In operation, material to be formed is poured when in a liquid state into the chamber 20 and, thereafter, the mating member is positioned as shown in FIG. 1. The liquid material is displaced into the molding space into a generally container shaped configuration; albeit liquid until solidified.

Carried on the exterior surface of the walls of the inner member, a member 40 and 42, for example, may be provided on the distal surface of which patterns in relief, such as a plurality of circles, may be debossed, as at 44. When the material poured into the space between the mating members is allowed or caused to solidify, a container will be defined of predetermined wall and floor thickness, which will have embossed upon it the pattern in relief on the distal surface of the member 40.

For use after the solidifying process is complete, means are provided to separate first the walls and, then, the floor of the inner collapsible mating member from the confronting surface of the molded piece. These means will now described.

Preferably, the collapsible member includes a cap suitably sized to close the open top of the container 12. From the cap the collapsible front, rear and side walls and, also, the floor depend therefrom. Operator means are provided for collapsing first the walls inwardly and, thereafter, the floor upwardly to separate the member substantially from the molded material in the molding space 20.

The operator means to collapse the member comprises, generally; (a) a rigid tube 62 of a length extending from an upper end 64 well above the open end of the container 12 to a lower end 66 which is not fixed to the floor 24, but, rather, is in abutting engagement with the inside floor surface, i.e., opposite to that of the projecting spacer means 30; (b) a rigid push rod 67 in the tube and of a length greater than that of the rigid tube with the lower end of the push rod being fixed to the floor 24 as at 69; and (c) means connecting the rigid tube and the collapsible walls and floor of the member. Generally, when the end of the push rod, which is provided with a handle 71, is held in a fixed position and the tube is drawn upwardly along it by squeezing the tube handle 72 towards the rod handle 71 to the position shown in FIG. 2, the rigid tube exerts a pulling force upon the collapsible walls and floor of the member.

Means are provided to direct the pulling force in a first stage of movement of pulling the wall inwardly and a second stage of movement of pulling the floor in an axial direction, as will now be described.

The structure to accomplish the first stage of movement will now be described. Rigid wall struts 90, 92, 94 and 96 are secured to the tube a distance from the end 66, which is less than the height of the walls of the collapsible member and extend toward connections at their respective distal ends 98, 100, 102 and 104 to the collapsible walls of the member. In the embodiment shown a rigid ring 78 is fastened by suitable means as at 80 to the rigid tube, with the struts being secured at the proximal ends 99, 101, 103 and 105 to the ring. It is thus seen than, when the tube is telescoped over the push rod, that is the handle 72 is moved toward the handle 71, the wall struts 90, 92, 94 and 96 will pull the sides inwardly and upwardly through a first stage of movement.

The structure to accomplish the second stage of movement, that of pulling the floor 24 upwardly in the operating chamber will now be described. It will be noted in FIG. 3, as well as FIG. 1, that the ring 78 includes openings 82, 84, 86 and 88 through which floor struts 106, 108, 110 and 112 are slidably passed. The struts have at their upper ends, hooked portions 115, 117, 119 and 121 slidingly captivating them from removal from the ring, and, at the lower ends or distal ends, the floor struts are connected to the floor as at 130, 132, 134 and 136. It is thus seen, that when the first stage of radial inwardly directed movement of the walls have been accomplished, the floor struts will have completed sliding movement and the hooked ends will hook up with the ring and, thereafter, the floor will be pulled upwardly in a second stage of movement to the position shown in FIG. 2.

In the preferred embodiment illustrated, the collapsible structure of the member 22 comprises a flexible continuous skin 15, which may be of plastic. The flexible skin structure spans a collapsible frame. The frame is composed of vertically oriented rigid force distribution elements for the walls and force distribution elements secured to the floor. The vertical wall elements 200, 202, 204 and 206 are generally T-shaped and extend between the upper zone 208 and the lower zone 210 of the walls of the member, but not completely across the surfaces. Suitable means are provided to secure the force distribution elements to the skin with the web of the elements extending into the operating chamber and providing connection locations for the wall struts. The floor distribution elements comprise T-shaped floor segments 262, 264, 266 and 268 with the flats being secured to the skin of the floor and with their respective webs extending upwardly and providing connection for the floor struts. A network of horizontal and vertical hinge strips 212, 214, and 216 comprising upper hinge strips and 220, 222, 224 and 226 comprising lower hinge strips, which are horizontally oriented and vertically oriented hinge strips 212', 214', 216' and 218' extend vertically and horizontally, in a ring about the upper and lower ends of the walls and vertically, medially of the walls of the member. These strips are composed of generally, readily vendable material creased at the corners of the member thus defining hinge means. The material of the strips while normally in the position shown in FIGS. 1 and 3 is yieldable in shape to be opened for extension or collapse of the member to the position shown in FIG. 2.

Preferably a cap 50 is provided which spans the walls of the container to close it; and a lid portion 68 is fixed to the rigid tube as at 70. An annular shield 290 may be provided to mate with a seal 292 on the exterior of the top 294 of the collapsible member, which top has an opening 296 therethrough for passage of the tube which is rigidly connected thereto as at 70.

It should be noted that an elongated compression spring 73 is circumposed about the push rod 67 to normally maintain the rigid tube 62 in its bottomed position, illustrated in FIG. 1.

It is thus seen that there has been provided a pair of matched mold parts, a female mold part or container and collapsible mold part which is receivable within the container and which defines a space between the mold part which can be utilized to freeze water into ice and, thereafter, the male part being collapsed and removed to provide a cup-shaped ice container which may be jacketed and utilized to store food. Other material may be molded within the apparatus for a variety of purposes within the scope of this invention.

What is claimed is:

1. A molding device comprising:
    a female cup-shaped mold part of rigid material comprising a floor and upstanding walls defining a main chamber of predetermined size and configuration a male collapsible member of a normal uncollapsed predetermined size and configuration comprising a floor and upstanding walls and defining an inner operating chamber, said member being sized for receipt in said main chamber;
    external, axially projecting spacer means on said device to space said floors a predetermined distance from one another;
    guide means to space said upstanding walls of said cup-shaped mold part and said male collapsible member a predetermined distance from one another and to define a space between said upstanding walls and floor to hold a charge of flowable material to be solidified;
    means to collapse the collapsible member in said female part through
        a. a first stage of movement of said walls of said member generally inwardly, and
        b. a second stage of axial movement of said floor of said member away from the floor of said female part;
    said means to collapse including operator means to move said walls and floor of said member to a collapsed configuration and size;
    said member comprising a flexible skin and rigid horizontally and vertically extending force transmitting elements fixed to the skin in the operating chamber and rigid means connecting the horizontal and vertical members to the operator means;
    said operator means comprising (a) a rigid tube of an axial length greater than the axial length of said male member and having a first end in abutting engagement with the floor of said male member in said operating chamber and a second end extending out of said operating chamber and (b) an elongate rigid push rod having a first end and a second end, (c) means connecting said first end to the floor of said member and spring means normally urging said rod and said tube into a first normal uncollapsed size and configuration and yieldable upon telescoping movement of said tube along said rod to store energy in the spring to restore the member to the normal uncollapsed size and configuration;

the rigid means connecting comprising a plurality of first struts secured to the rigid tube for movement therewith, and to the walls of said member;

said member including a network in the operating chamber of horizontal and vertical members fixed to said skin normally maintaining said member in said predetermined size and configuration and bendable to collapse said walls and floor and said member upon movement of said tube along said push rod;

handle means on said push rod and said tube to move said tube along said push rod;

said walls of said collapsible member including embossing means extending into said space for imprinting an image on an article being molded;

said rigid means connecting including a plurality of second rigid struts, each having a first end and a second end, the second end of each strut being secured to the floor of the member at spaced points and at the first end of each strut including sliding interconnecting means of said struts to said tube permitting a predetermined amount of sliding movement of said first ends upon relative axial movement of said tube and push rod, and hook means to constrain said struts to movement with said tube upon continued relative movement of said rod and tube; and the sliding interconnecting means comprising a ring with spaced opening secured to said tube and each of said second struts slidingly extends to one of said openings and includes said strut means on the first end thereof.

2. The device as set forth in claim 1 wherein said adjustable member includes cap means sized to span the walls of said female part to close the molding chamber.

* * * * *